United States Patent
Brahmavar et al.

(10) Patent No.: US 9,837,867 B2
(45) Date of Patent: Dec. 5, 2017

(54) ELECTRIC MACHINE, ROTOR AND ASSOCIATED METHOD

(71) Applicant: Regal Beloit America, Inc., Beloit, WI (US)

(72) Inventors: Subhash Marutirao Brahmavar, Fort Wayne, IN (US); Greg Heins, Rowville (AU); Charles Richard Langford, Rowville (AU)

(73) Assignee: Regal Beloit America, Inc., Beloit, WI (US)

( * ) Notice: Subject to any disclaimer, the term of this patent is extended or adjusted under 35 U.S.C. 154(b) by 726 days.

(21) Appl. No.: 14/335,970

(22) Filed: Jul. 21, 2014

(65) Prior Publication Data

US 2016/0020656 A1    Jan. 21, 2016

(51) Int. Cl.
| | | |
|---|---|---|
| *H02K 15/03* | (2006.01) | |
| *H02K 1/27* | (2006.01) | |
| *H02K 5/173* | (2006.01) | |
| *H02K 7/14* | (2006.01) | |

(52) U.S. Cl.
CPC ......... *H02K 1/2793* (2013.01); *H02K 5/1732* (2013.01); *H02K 7/14* (2013.01); *H02K 15/03* (2013.01)

(58) Field of Classification Search
CPC .............................. H02K 1/2793; H02K 15/03
USPC .................................................. 310/156.12
See application file for complete search history.

(56) References Cited

U.S. PATENT DOCUMENTS

| | | | |
|---|---|---|---|
| 2,885,126 A | 5/1959 | Hudson | |
| 3,596,015 A | 7/1971 | Jullien Davin | |
| 3,806,785 A | 4/1974 | De Valroger | |
| 4,027,213 A | 5/1977 | De Valroger | |
| 4,547,713 A | 10/1985 | Langley et al. | |
| 5,565,721 A | 10/1996 | Knappe | |
| 7,165,931 B2 | 1/2007 | Olivier et al. | |
| 2006/0267442 A1* | 11/2006 | Ionel .................... | H02K 1/2726 310/216.004 |
| 2006/0284506 A1* | 12/2006 | Kim ...................... | H02K 1/2733 310/156.13 |
| 2010/0320858 A1* | 12/2010 | Ishikawa .............. | H02K 1/2793 310/156.07 |
| 2011/0285237 A1* | 11/2011 | Amari .................. | H02K 1/2793 310/156.07 |
| 2012/0086303 A1* | 4/2012 | Hsu ........................ | H02K 1/182 310/216.113 |
| 2012/0194022 A1 | 8/2012 | Lau et al. | |
| 2012/0194023 A1 | 8/2012 | Lau et al. | |
| 2012/0262022 A1* | 10/2012 | Takemoto ............ | H02K 1/2793 310/156.35 |

(Continued)

FOREIGN PATENT DOCUMENTS

| | | |
|---|---|---|
| CH | 696293 A5 | 3/2007 |
| CN | 101051767 A | 10/2007 |
| CN | 102695536 A | 9/2012 |

(Continued)

*Primary Examiner* — Terrance Kenerly
(74) *Attorney, Agent, or Firm* — John Wagley (57) ABSTRACT

A rotor for connection to a rotating member for use in an electric machine is provided. The rotor includes a first member connected to the rotating member and generally positioned perpendicularly thereto and a second member connected to one of the rotating member and the first member.

15 Claims, 11 Drawing Sheets

(56) References Cited

U.S. PATENT DOCUMENTS

| | | | | |
|---|---|---|---|---|
| 2014/0042859 A1* | 2/2014 | Wang | ................... | H02K 21/24 310/156.32 |
| 2015/0280506 A1* | 10/2015 | Cawthorne | ............ | H02K 1/165 290/53 |

FOREIGN PATENT DOCUMENTS

| | | |
|---|---|---|
| CN | 203278427 U | 11/2013 |
| DE | 3021396 A1 | 12/1981 |
| EP | 711468 B1 | 1/1997 |
| FR | 1460560 A | 10/1966 |
| GB | 933996 A | 8/1963 |
| GB | 949390 A | 2/1964 |
| GB | 962323 A | 7/1964 |
| GB | 1048592 A | 11/1966 |
| GB | 1129522 A | 10/1968 |
| GB | 1169936 A | 11/1969 |
| GB | 1213377 A | 11/1970 |
| GB | 1223292 A | 2/1971 |
| GB | 1353082 A | 5/1974 |
| GB | 1370655 A | 10/1974 |
| GB | 1395401 A | 5/1975 |
| GB | 1434192 A | 5/1976 |
| GB | 1434193 A | 5/1976 |
| GB | 1578025 A | 10/1980 |
| JP | 11063273 A | 3/1999 |
| JP | 2002159152 A | 5/2002 |
| JP | 2002199775 A | 7/2002 |

\* cited by examiner

ELECTRIC MACHINE, ROTOR AND ASSOCIATED METHOD

BACKGROUND OF THE INVENTION

The embodiments described herein relate generally to a rotor for use in an electric machine, and more specifically, to an apparatus and method associated with a rotor for use in an axial flux electric motor.

A common configuration for an electric motor is radial-flux, which is composed from two cylinders, a cylindrical stator and a cylindrical rotor (having an axial shaft), with a cylindrical air gap in between and in which the flux travels across the air gap in a direction that is radial to the shaft on the rotor. In order to hold the two cylinders concentric and thus keep the air gap constant thickness in a radial flux motor, it is necessary to support the shaft at each end of the motor.

Given that many applications which are mechanically powered by a radial-flux electric motor do not intrinsically require a shaft, it is desirable to eliminate the necessity for a shaft and thus provide a cheaper and simpler structure. An axial flux motor is one such structure.

Further, many applications which are mechanically powered by a radial-flux electric motor provide for ample landscape for a large diameter motor but little room along the longitudinal axis of the shaft. An axial flux motor is well suited to such applications as the axial flux motor with high motor power capacity may indeed have a very short axial shaft length.

Typically an axial flux motor includes a rotor having one or more permanent magnets mounted to a face of the rotor and a stator having a stator winding connected to a power source. The motor also includes a bearing positioned between the rotor and the stator for rotationally supporting movement of the rotor relative to the stator. The bearing provides an air gap between the rotor and the stator. The permanent magnets can be replaced by a magnet field induced by an electrical winding.

Due to its high speed operation, it is desirable to provide a rotor with a low mass. To provide a motor with sufficient power in operation, it is desirable to provide a rotor with a large diameter rotor. Providing a motor with a rotor that has both a large diameter and a low mass, yet able to be sufficiently rigid for high speed operation provides a challenge. Further, providing such a rotor at low cost is increasingly difficult.

The efficiency of motors may be improved by providing the magnetic flux of the rotor with permanent magnets attached to the rotor. Such magnets are typically called permanent magnet motors and are typically more efficient than motors that do not use permanent magnets, typically induction motors. One type of permanent magnet motor utilizes electronics to time the energizing of the stator coils and is called an electronically commutated motor or ECM motor.

Such permanent magnet and ECM motors may use stronger magnets to further improve their efficiency. One type of such stronger magnet are called rare earth magnets and are made of rare earth metals, for example, neodymium. Neodymium magnets have been very expensive and their cost has been very volatile, particularly in recent years.

The present invention is directed to alleviate at least some of these problems with the prior art.

BRIEF DESCRIPTION OF THE INVENTION

According to an embodiment of the present invention, an axial flux electric motor is provided. The motor includes a housing and a stator. The housing defines an inner periphery and an outer periphery of the housing. The stator has a solitary ferrous core and is fixedly secured to the housing. The motor further includes a solitary rotor rotatably secured to said housing, the rotor including a ferrite magnet, the magnet defining at least one an outer periphery extending beyond said stator in a direction normal to the rotation of said rotor and an inner periphery extending beyond said stator in a direction normal to the rotation of said rotor, at least one of said stator or said rotor adapted for use in a fluid moving application.

According to an aspect of the present invention, the ferrite magnet may be generally ring shaped.

According to another aspect of the present invention, the ferrite magnet may have a plurality of magnet segments.

According to another aspect of the present invention, a skewed magnetic field may be induced into the magnet.

According to another aspect of the present invention, the outer periphery of the ferrite magnet may extend beyond the stator in a direction normal to the rotation of the ring.

According to another aspect of the present invention, the inner periphery of the ferrite magnet may extend beyond the stator in a direction normal to the rotation of the ring.

According to another aspect of the present invention, the outer periphery of the magnet may extend beyond the stator in a direction normal to the rotation of the rotor a first extension distance, the inner periphery of the magnet may extend beyond the stator in a direction normal to the rotation of the rotor a second extension distance, the ferrous core may be generally ring shaped defining a ferrous core radial distance and the first extension distance and the second extension distance may be as large as the ferrous core radial distance.

According to another aspect of the present invention, the outer periphery of the magnet may extend beyond the stator in a direction normal to the rotation of the rotor. The outer periphery of the magnet may define a magnet diameter. The ferrous core of the stator may define a stator core diameter and the magnet diameter may be as much as 50 percent larger than stator core diameter.

According to another aspect of the present invention, the rotor may further include a rotor core. The rotor core may be generally ring shaped. The rotor core may define a rotor core inner periphery, an rotor core outer periphery, and a rotor core radial distance between the rotor core inner periphery and the rotor core outer periphery. The outer periphery of the magnet may extends beyond the rotor core in a direction normal to the rotation of the rotor a first extension distance. The inner periphery of the magnet may extend beyond the rotor core in a direction normal to the rotation of the rotor a second extension distance. The first extension distance and the second extension distance may be as large as the rotor core radial distance.

According to another aspect of the present invention, the rotor may further include a rotor core. The rotor core may be generally ring shaped. The rotor core may define a rotor core inner periphery, a rotor core outer periphery, and a rotor core radial distance between the rotor core inner periphery and the rotor core outer periphery. The outer periphery of the magnet may extend beyond the rotor core in a direction normal to the rotation of the rotor. The outer periphery of the magnet may define a magnet diameter. The rotor core of the rotor may define a rotor core diameter and the magnet diameter may be as much as 50 percent larger than rotor core diameter.

According to another aspect of the present invention, the ferrite magnet may include a protrusion or a recess. The rotor may include a protrusion or a recess. The protrusion or recess of the ferrite magnet may cooperate with the protrusion or recess of the rotor to secure the ferrite magnet to the rotor.

According to another aspect of the present invention, the fluid moving application may be an air flowing application, a liquid pumping application. a HVAC application or a blower premix application.

According to another aspect of the present invention, a rotor assembly is rotatably secured to a motor housing. The rotor assembly includes a rotor rotatably secured to the housing. The rotor includes a ferrite magnet. The magnet may define an outer periphery extending beyond the stator in a direction normal to the rotation of the rotor and an inner periphery extending beyond the stator in a direction normal to the rotation of the rotor, The stator or the rotor may be adapted for use in a fluid moving application.

According to another aspect of the present invention, the ferrite magnet may be generally ring shaped.

According to another aspect of e present invention, the ferrite magnet may include a plurality of magnet segments According to another aspect of the present invention, a skewed magnetic field may be induced into the magnet.

According to another aspect of the present invention, the outer periphery of the ferrite magnet may extend beyond the stator in a direction normal to the rotation of the ring.

According to another aspect of the present invention, the inner periphery of the ferrite magnet may extend beyond the stator in a direction normal to the rotation of the ring.

According to another aspect of the present invention, the fluid moving application may be an air flowing application, a HVAC application or a blower premix application.

According to another embodiment of the present invention, a method for fabricating a motor is provided. The method includes the step of fabricating a first set of motor parts. The motor parts may include a first rotor using neo magnets and a first stator for use in a neo motor. The method also includes the step of fabricating a second set of motor parts including a second rotor using ferrite magnets for use in a ferrite motor. The method also includes the steps of ascertaining the motor magnet type, ferrite or neo and selecting one of the first rotor and the second rotor in accordance with desired motor magnet type. The method also includes the step of assembling a motor with one of first rotor and the second rotor and first stator such that the desired motor magnet type is substantially provided.

DETAILED DESCRIPTION OF THE INVENTION

Given that many applications which are mechanically powered by a radial-flux electric motor do not intrinsically require a shaft, it is desirable to eliminate the necessity for a shaft and thus provide a cheaper and simpler structure. An axial flux motor is one such structure. Due to its high speed operation, it is desirable to provide a rotor with a low mass. To provide a motor with sufficient power in operation, it is desirable to provide a rotor with a large diameter rotor. Providing a motor with a rotor that has both a large diameter and a low mass, yet able to be sufficiently rigid for high speed operation provides a challenge. Further, providing such a rotor at low cost is increasingly difficult. The efficiency of motors may be improved by providing the magnetic flux of the rotor with permanent magnets attached to the rotor. Such magnets are typically called permanent magnet motors and are typically more efficient than motors that do not use permanent magnets, typically induction motors. One type of permanent magnet motor utilizes electronics to time the energizing of the stator coils and is called an electronically commutated motor or ECM motor.

Such permanent magnet and ECM motors may use stronger magnets to further improve their efficiency. One type of such stronger magnet are called rare earth magnets and are made of rare earth metals, for example, neodymium. Neodymium magnets have been very expensive and their cost has been very volatile, particularly in recent years. Ferrite magnets are lower cost alternatives to neodymium magnets, but provide a much weaker magnetic field. Due to increased customer and industry demands, lower costs, and improved performance in capacity and efficiency are desirable in the design and manufacture of devices powered by electric motors. The methods, systems, and apparatus described herein facilitate lower costs and improved performance in capacity and efficiency for an electric machine. This disclosure provides designs and methods to lower costs and improve performance in capacity and efficiency. Technical effects of the methods, systems, and apparatus described herein include at least one of improved performance and quality and reduced operating costs.

Figure 1:
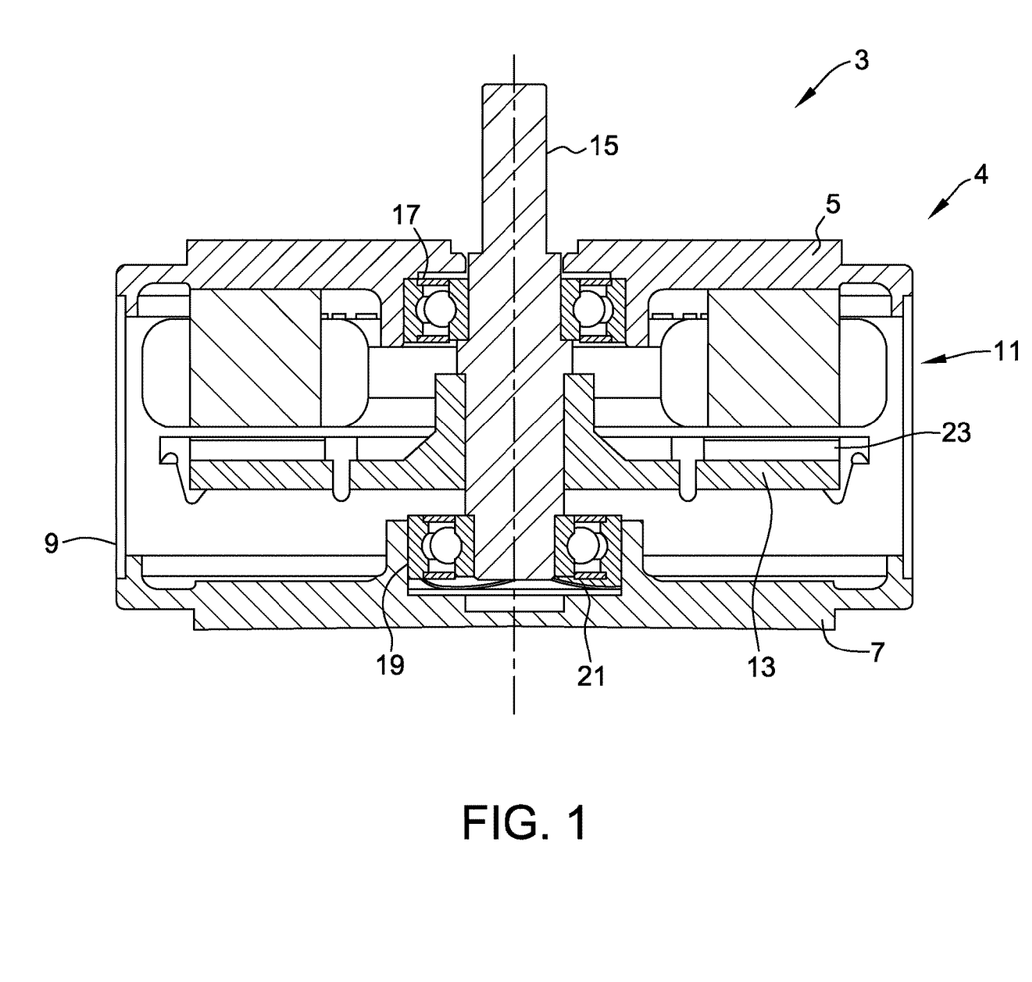
FIG. 1 is an cross sectional plan view of an axial flux motor according to the present invention.
Figure 2:
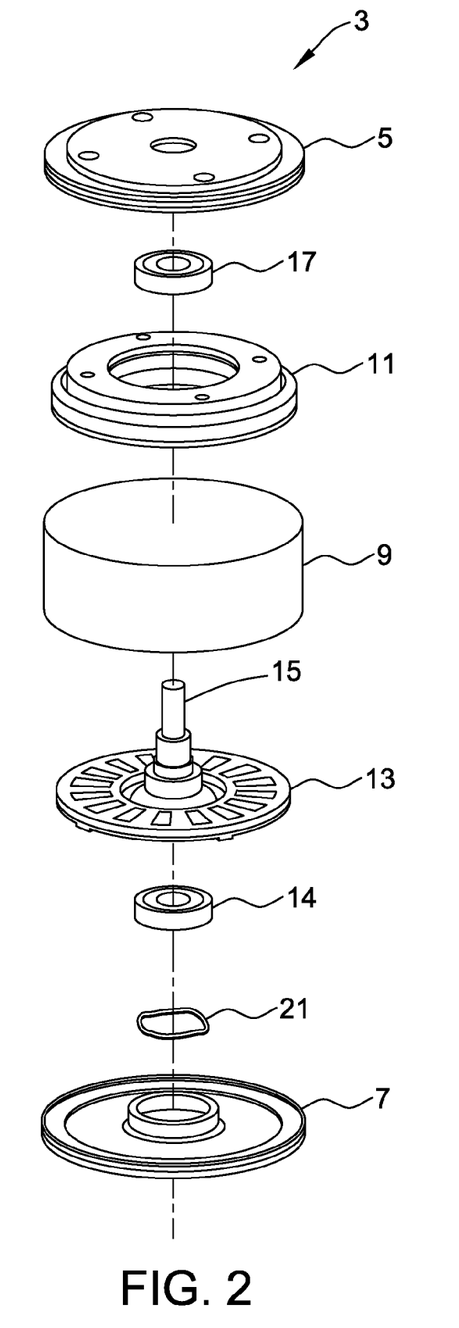
FIG. 2 is exploded perspective view of the motor of FIG. 1.

FIGS. 1-2 of the drawings show an axial motor 3 which is exemplary of a motor using the rotor of the present invention. The components of the motor can be best seen in the exploded view shown in FIG. 2. These components include a housing 4, incorporating end shields 5 and 7 and a side wall 9, a stator 11 (although the windings are not shown in the drawings) mounted within the housing. A rotor disc 13 is mounted on a shaft 15 which is rotatable within the housing by means of bearings 17 and 19. A wave washer 21 is also included between the bearing 17 and the end shield 5 so as to reduce noise produced by the bearing and promote quieter operation of the motor 3.

As can be seen in the cross sectional side view shown in FIG. 1, the rotor disc 13 includes a plurality of permanent magnets 23, which are preferably ferrite magnets. As can also be seen in FIG. 1, an air gap exists between the top face of the magnet positioning device 1 (attached to the rotor disc 13) and a lower face of the stator 11.

Figure 3:
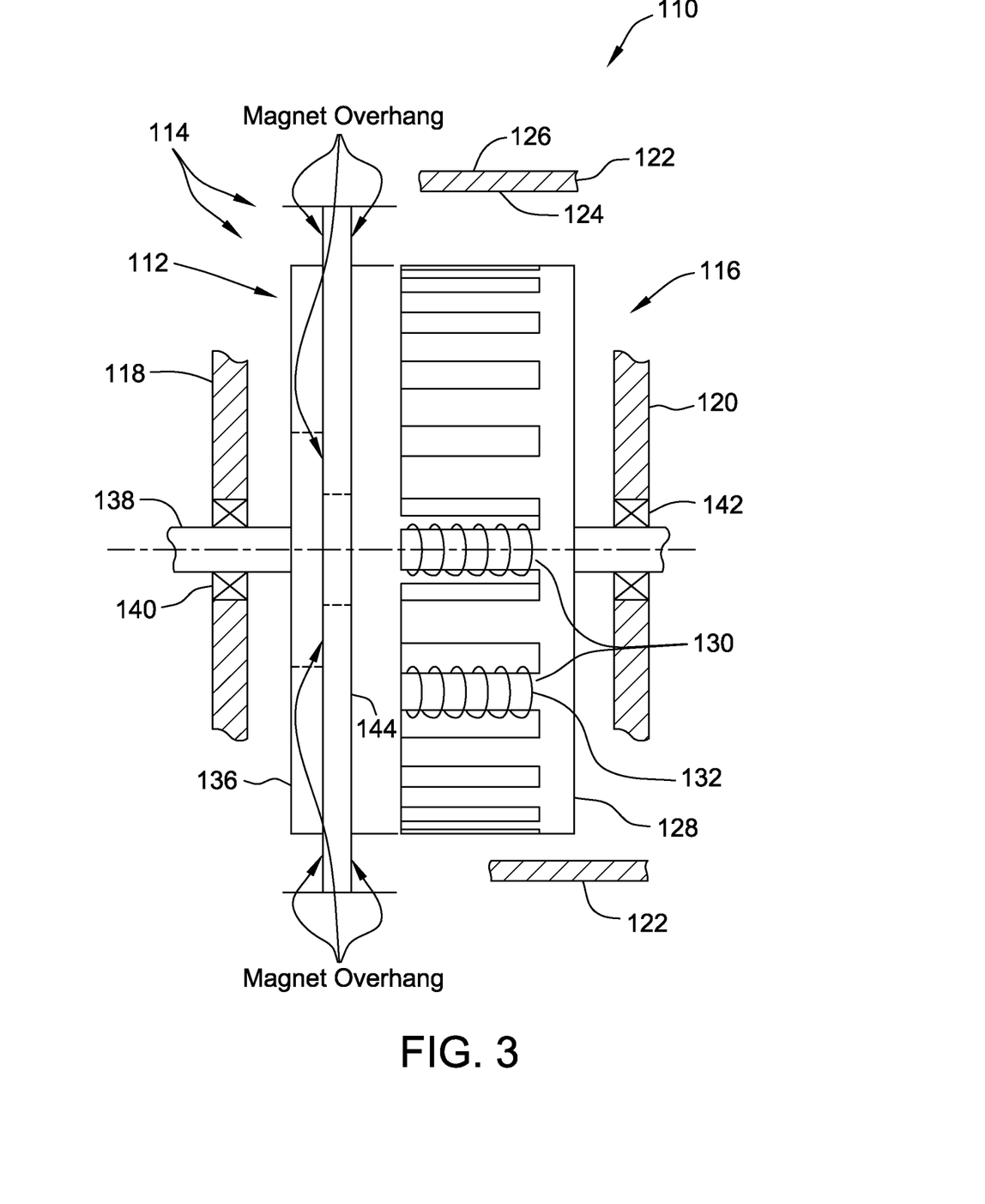
FIG. 3 is a an end view of an axial flux motor according to another embodiment of the present invention having a ferrite ring magnet.

According to an embodiment of the present invention and referring now to FIG. 3, an axial flux electric motor 110 is provided. The motor 110 is generally similar to the motor 3 of FIGS. 1-2, except the motor 110 includes a rotor assembly 112 that is different than the rotor disc 13 of the motor 3 of FIGS. 1-2. The motor 110 includes a housing 114 and a stator assembly 116. The housing 114 may have any suitable size and shape. The housing 114 may be made of any suitable durable material, such as a metal or a polymer. The housing 114 may be integral or be made from a plurality of components. For example, the housing 114 may include opposed endcap 118 and 120 and a shell 122. The housing 114 defines an inner periphery 124 and an outer periphery 126 of the housing 114.

Figure 4:
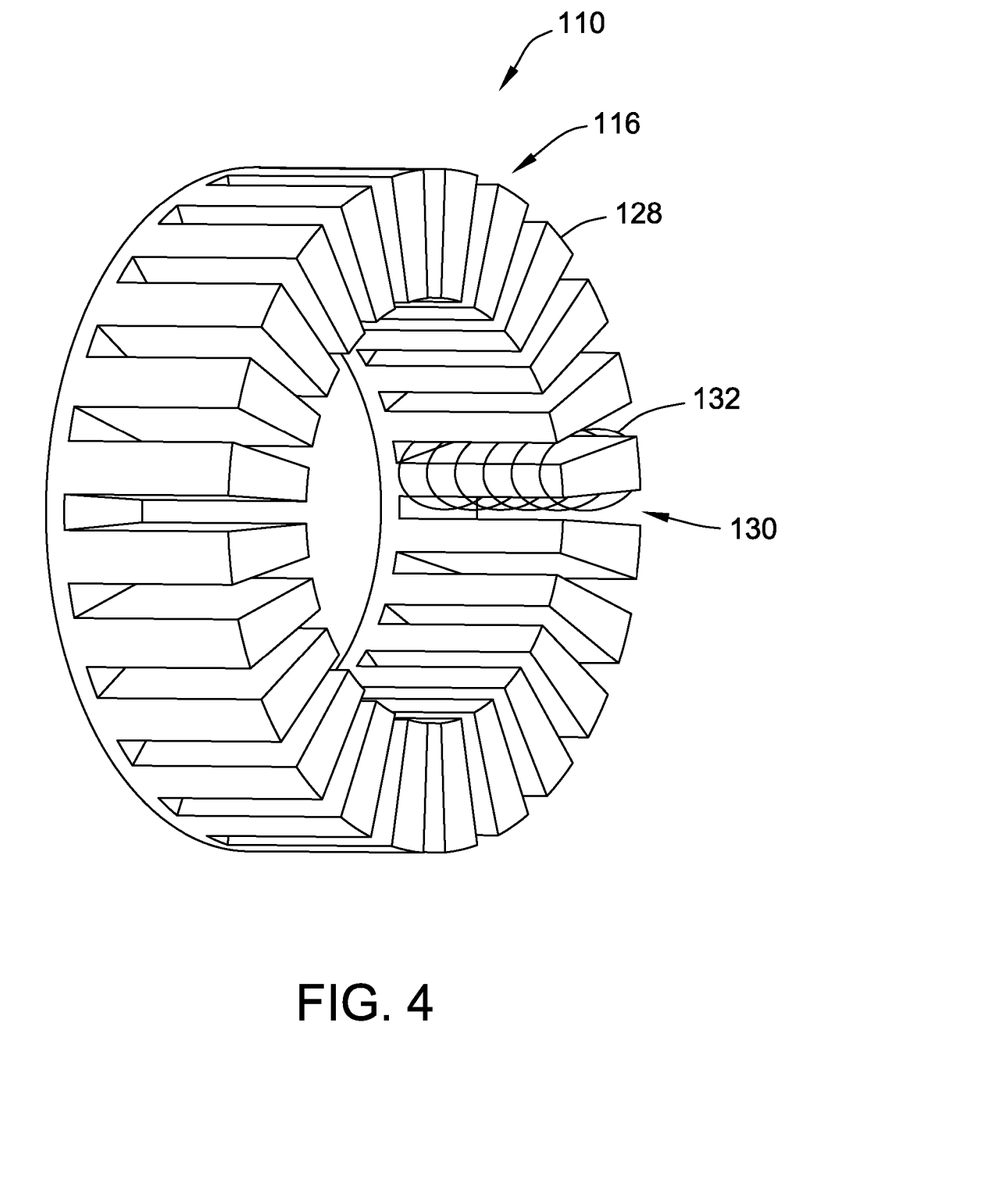
FIG. 4 is a perspective view of the stator core of the motor of FIG. 3.

Referring now to FIGS. 3 and 4, the stator assembly 116 includes a stator core 128. The core 128 is fixedly secured to the housing 114. The stator assembly 116 further includes a plurality of coils 130 including magnet wire 132 wound around protrusions in the form of teeth 134 formed in the stator core 128. The coils are electrically energized in a sequence to create a timed cycle of magnetic impulses to cause the rotor 112 to rotate relative to the stator assembly 116 at a desired speed or speeds. The stator core 128 may have any suitable size and shape. The stator core 128 may be made of any suitable durable magnetically conductive material, for example as a ferrous metal. The stator core 128 may be integral or be made from a plurality of components. As shown in FIGS. 3 and 4 and to reduce core losses, the stator core 128 is made of laminations that are connected to form the stator core 128. The teeth 134 are formed in the core 128.

The rotor assembly 112 includes a rotor 136 supported by a shaft 138 which is rotatably connected to endcaps 118 and 120 by, for example, bearings 140 and 142, respectively. The rotor assembly 112 also includes a magnet 144 connected to a surface 146 of the rotor 136.

Figure 5:
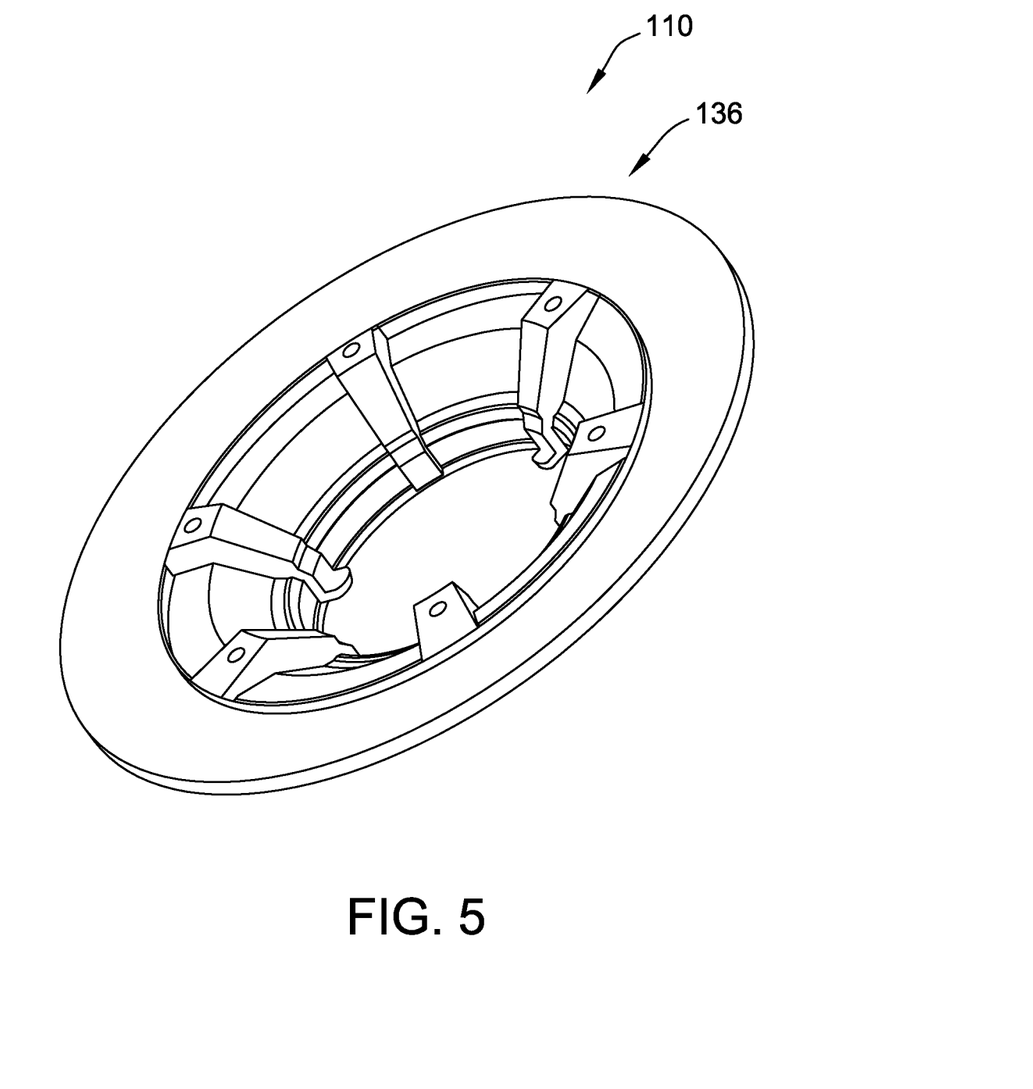
FIG. 5 is a perspective view of the rotor of the motor of FIG. 3.
Figure 6:
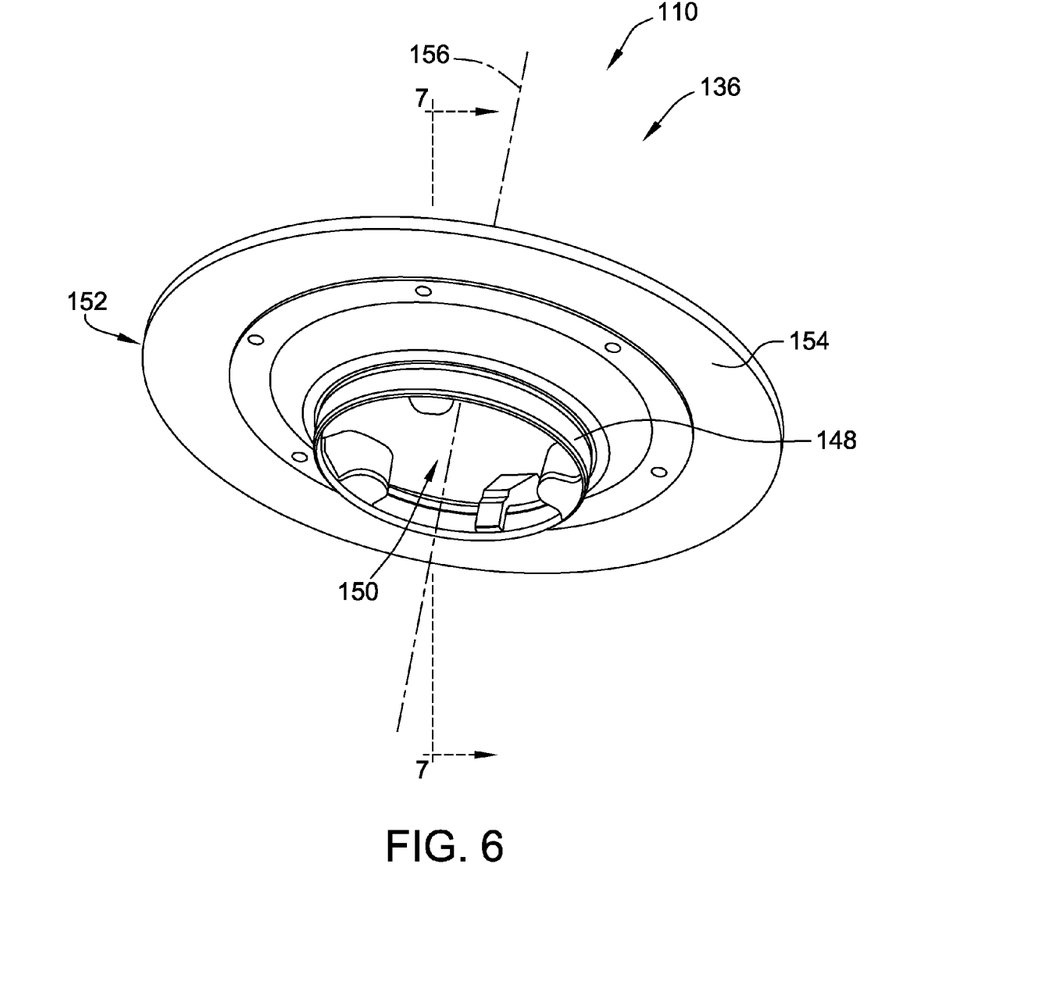
FIG. 6 is another perspective view of the rotor of the motor of FIG. 3, showing the hub of the rotor.
Figure 7:
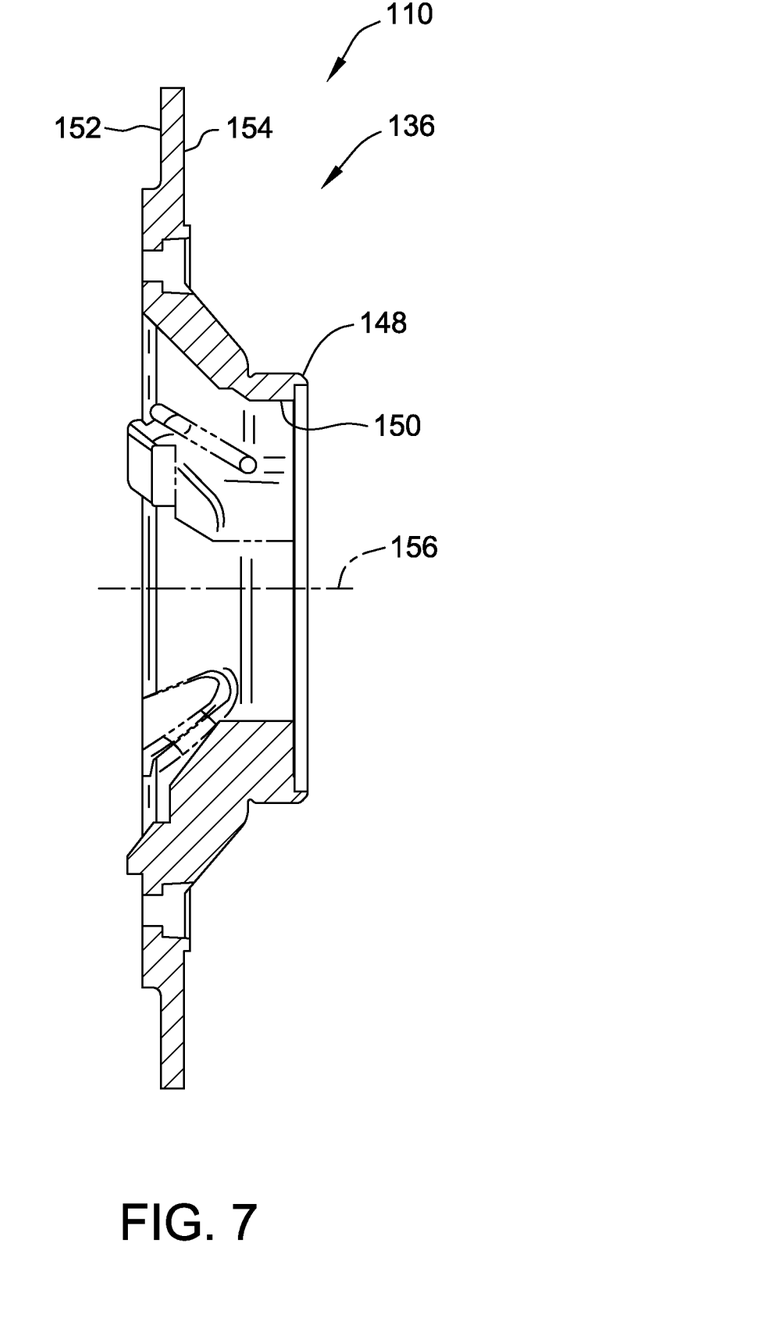
FIG. 7 is cross sectional view of the rotor of FIG. 6 along the line 7-7 in the direction of the arrows.

Referring now to FIGS. 5-7, the rotor 136 is shown in greater detail. The rotor 136 may have any suitable size and shape. The rotor 136 may be made of any suitable durable material, such as a metal, that for example may be cast or laminated, or a composite of ferrous metal. The rotor 136 may be integral or be made from a plurality of components. The rotor 136 may be made from a metal and may be cast generally into its final form, with some machining provided after casting. Alternatively, the rotor may be made from sheet metal and formed into a general final shape and may also have some final machining.

As shown in FIGS. 6 and 7, the rotor 136 may include a central hub 148 that defines a central bore 150. The rotor is rotatably secured to the shaft 138 (see FIG. 3) at central bore 150 of hub 148. A disc shaped portion 152 of the rotor 136 extends outwardly from the hub 148. The disc shaped portion 152 includes a face 154 normal to shaft longitudinal axis 156. The magnet 144 (see FIG. 3) is secured to face 154. The magnet may be secured to the face 154 in any suitable way. For example, the magnet 144 may be secured to face 154 by adhesives. Alternatively or in addition, additional features (for example protrusions and voids not shown) can be placed on the magnet 144 and/or the face 154 of the rotor 136 to secure the magnet 144 to the face 154. Further a retainer (not shown) may be used to secure the magnets to the rotor.

Figure 8:
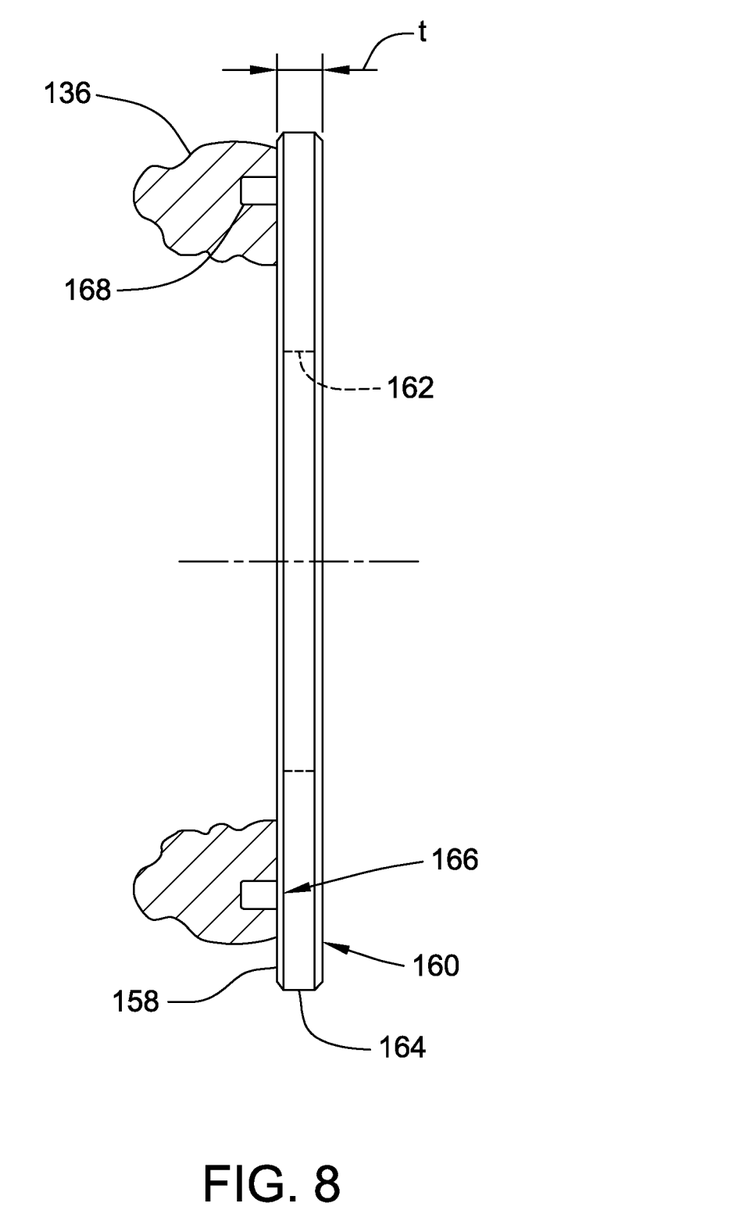
FIG. 8 is an end view of the magnet of the motor of FIG. 1.
Figure 9:
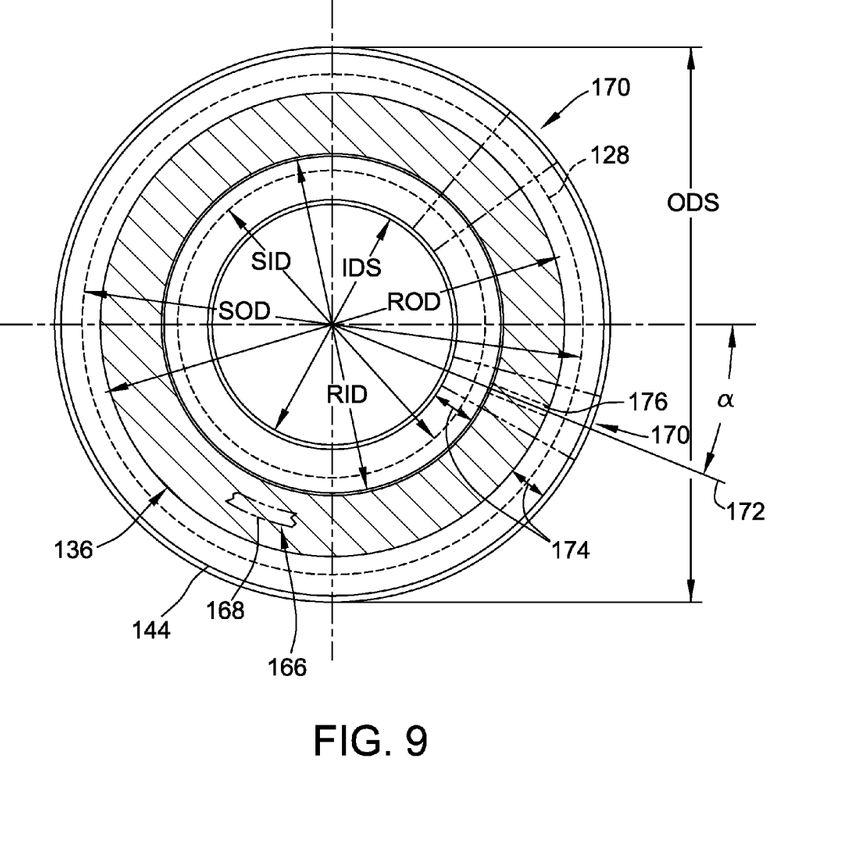
FIG. 9 is a plan view of the magnet of FIG. 6.

Referring now to FIGS. 8 and 9, the magnet 144 is shown in greater detail. As shown in FIG. 8, the magnet 144 is a solitary ring having opposed faces 158 and 160 and a central bore or opening 162. The magnet 144 also includes an outer diameter 164. The magnet 144, unlike the magnets 23 of the motor 3 of FIGS. 1-2, is made of an inexpensive magnetizible material, for example a hard ferrite. For example, the magnetizible material may be Alnico or Samarium Cobalt. The magnet 144, unlike the magnets 23, is a solitary magnet. The solitary magnet is less expensive to produce and easier to secure to the rotor that a set of individual magnets. While the magnet 144 is as shown a solitary ring, it should be appreciated that a modular or multicomponent magnet made of an inexpensive magnetizible material may be utilized in accordance with the invention.

While as stated above, the magnet 144 may be secured to face 154 of the rotor 136 by adhesives, to provide addition securement of the magnet to the rotor 136, the magnet and rotor may include features in the form of, for example, protrusions and void, to secure the magnet to the rotor and to provide an anti rotation feature. For example and as shown, the rotor 136 may include a Radial (not shown) or circular groove 166 formed in face 154 of the rotor 136 that is sized to match a radial protrusion (not shown) or a circular protrusion 168 extending from face 158 of the magnet 144. The protrusion 168 may be in interference with the groove 166 and/or may include features (not shown) in the form of tabs and indents to secure the magnet 144 to the rotor 136 with or without the use of adhesives.

Typically the magnet 144 is manufactured from a magnetizable material and later permanently magnetized by magnetizing coils. For the magnet to operate efficiently in a motor the magnet is magnetized with a plurality of poles 170 with a first number of magnet poles that is typically used with a second number of stator coils or stator teeth (there being one coil per tooth). For example, a few of the typical combination of stator teeth and rotor magnet poles include 12 teeth with 10 poles and 18 teeth with 16 poles. For the motor 110 of FIGS. 3-8, the stator assembly 116 includes 24 teeth, so the rotor 136 typically would have 20 poles 170. The rotor 136 is thus magnetized to provide the 20 poles 170. For optimum efficiency the poles 170 have an axial magnetic orientation and a radial geometric orientation.

To reduce cogging torque and corresponding motor noise, the orientation of the poles 170 may, as shown, not have an exact radial orientation or may be skewed. The orientation of the poles 170 may be oriented an angle α of, for example, 1-3 degrees from radial centerline 172. This skewing can be easily accomplished by skewing the magnetizing coils during the manufacture of the coils.

To orient the angular position of the poles 170 of the magnet 144 with the rotor 136, the rotor and/or the magnet 144 may include an angular orientation feature in the form of a radial groove 174 formed in the rotor 136 that mates with a radial protrusion 176 formed in the magnet 144. Any other angular orientation feature, either temporary or permanent may be used, for example, marks on the magnets and the rotor.

Since magnetized ferrite magnets provide a weaker magnetic field per unit volume than neodymium magnets, the ferrite magnet 144 is typically thicker than the neodymium magnet it is intended to replace. For example the ferrite magnet 144 may have a thickness t that is from 2 to 5 times a thick as a neodymium magnet. For example a neodymium magnet with a thickness of 6 millimeters may be replaced with a ferrite magnet 144 with a thickness of 12 to 18 millimeters.

To provide additional magnetic field strength to the ferrite magnet 144 the ferrite magnet 144 may have the central bore 162 the outer diameter 164 overhang or extend beyond envelopes of the rotor 136 or the stator core 128 either radially outwardly or radially inwardly, or both. The overhang of the magnet 144 is only limited by the size of the shaft 138 and the size of the shell 122. The ferrous core of the stator may define a stator core diameter and the magnet diameter may be as much as 50 percent larger than stator core diameter. The rotor core of the rotor may define a rotor core diameter and the magnet diameter may be as much as 50 percent larger than rotor core diameter.

For example and as shown in FIG. 9, the outer diameter 164 of the magnet 144 has an outer diameter size ODS which is larger than an outer diameter size SOD of the stator core 128 and which is also larger than an outer diameter size ROD of the rotor 136. Similarly, the bore 162 of the magnet 144 has an inner diameter size IDS which is smaller than an inner diameter size SID of the stator core 128 and which is also smaller than an inner diameter size RID of the rotor 136.

The magnet 144 may have the outer diameter size ODS that may be as much as 25 percent larger, 50 percent larger, 75 percent larger or more than the outer diameter size SOD of the stator core 128. Similarly the magnet 144 may have the outer diameter size ODS that may be as much as 25 percent larger, 50 percent larger, 75 percent larger or more than the outer diameter size ROD of the rotor 136.

The bore 162 of the magnet 144 may have an inner diameter size IDS that may be as much as 25 percent smaller, 50 percent smaller, 75 percent smaller or less than the inner diameter size SID of the stator core 128. Similarly, the bore 162 of the magnet 144 may have an inner diameter size IDS that may be as much as 25 percent smaller, 50 percent smaller, 75 percent smaller or less than the inner diameter size RID of the rotor 136

It should be appreciated that by increasing the overhang of the magnet 144, either radially outwardly or radially inwardly, or both, beyond the rotor 136 and/or the stator core 128 and by increasing the thickness t of the magnet 144, an inexpensive ferrite magnet may be used with the same overall magnet field strength as a that of a set of neodymium magnets. Further it is possible to design an axial flux motor with a set of neodymium magnets and to design an axial flux motor with an inexpensive ferrite magnet ring that can use common components, where only the rotor assemblies need to be different. Any difference in rotor component diameters could be accommodated if the constraints of the shell and the shaft were considered and any difference in rotor thickness could be accommodated by component position relative to the motor shaft.

It should be appreciated that the motor 110 of FIGS. 3-9 may be an air flowing application, a liquid pumping application, a HVAC application or a blower premix application.

Figure 10:
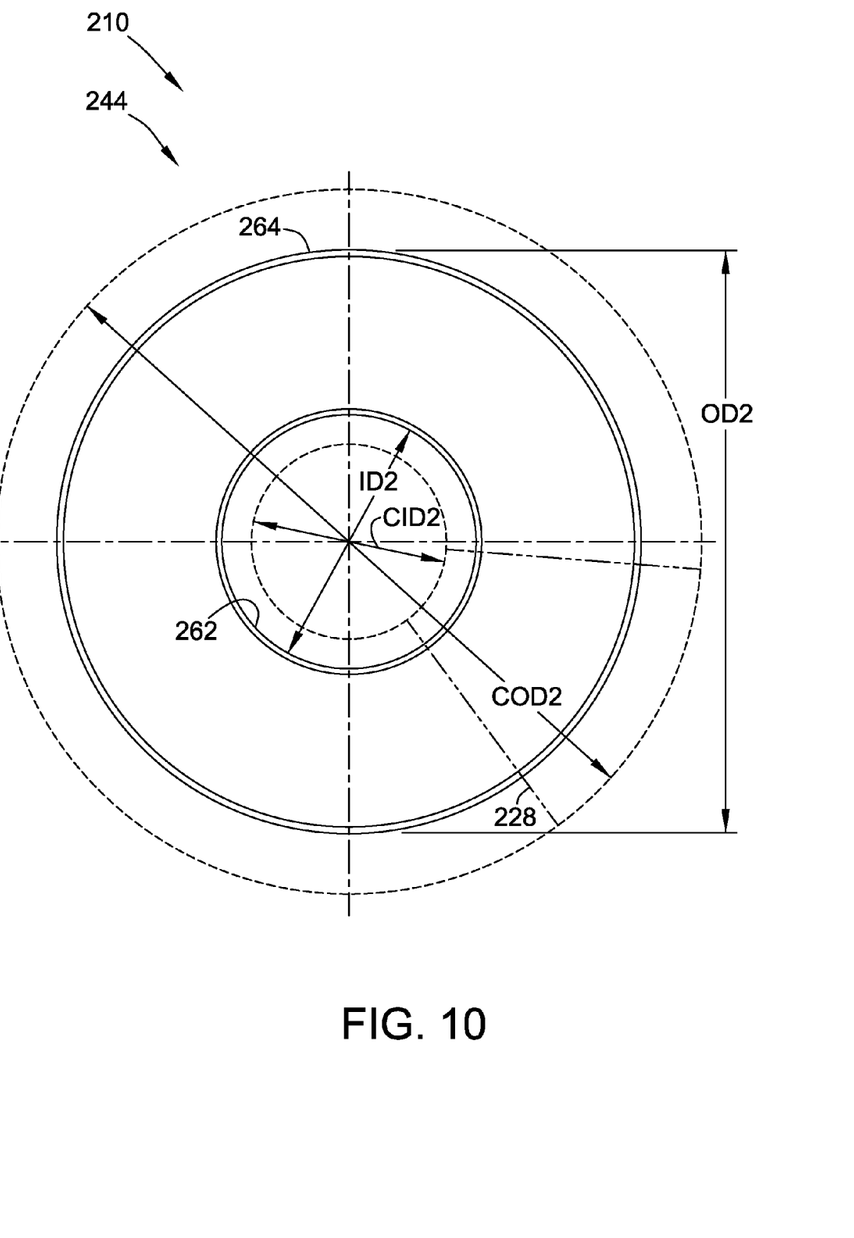
FIG. 10 is a plan view of an axial flux motor according to another embodiment of the present invention for a high speed application.

It should also be appreciated that for high speed applications, where core loss is predominant and copper loss is minimal, flux weakening can be achieved by using negative overhang (having the magnet peripheries be within or inside those of the stator or rotor). For example and as shown in FIG. 10, a motor 210 according to the present invention may be provided such that outside diameter OD2 of outside diameter 264 of magnet 244 may be smaller than the stator core outside diameter COD2 of stator core 228 and inside diameter ID2 of bore 262 of the magnet 244 may be larger than stator core inside diameter CID2

Figure 11:
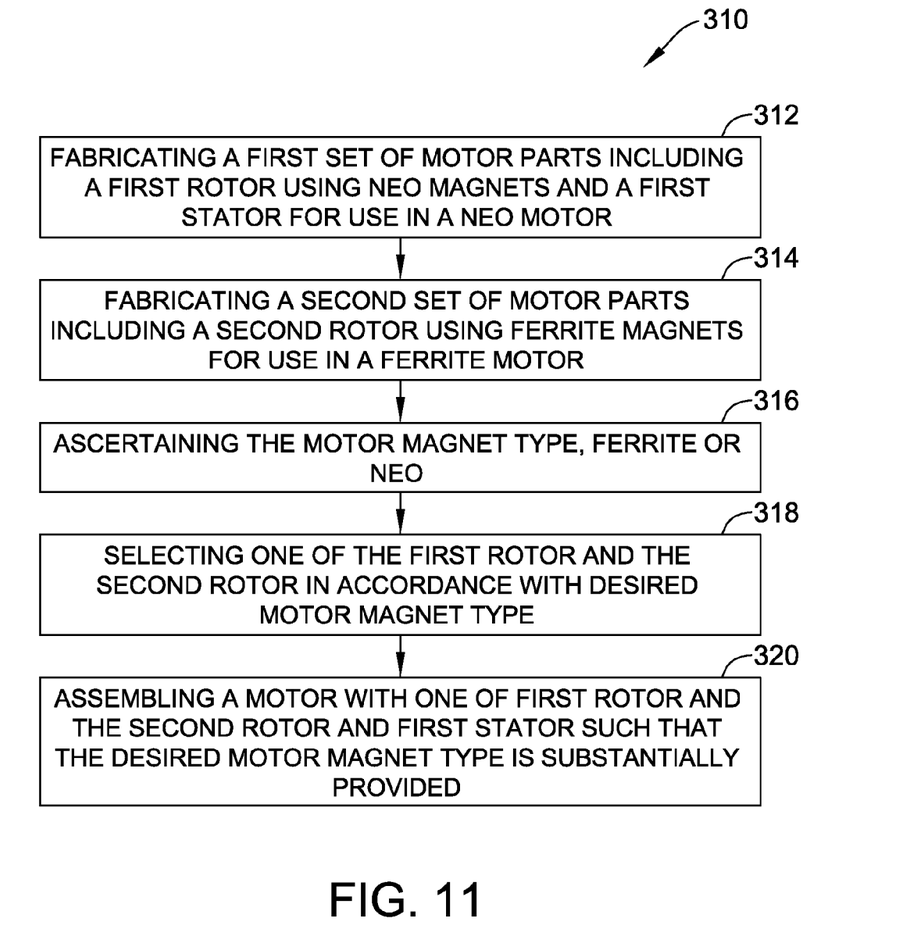
FIG. 11 is a flow chart of an exemplary method for providing a motor according to another embodiment of the present invention.

According to another embodiment of the present invention and referring to FIG. 11, a method 310 for fabricating a motor is provided. The method includes step 312 of fabricating a first set of motor parts. The motor parts may include a first rotor using neo magnets and a first stator for use in a neo motor. The method also includes step 314 of fabricating a second set of motor parts including a second rotor using ferrite magnets for use in a ferrite motor. The method also includes the step 316 of ascertaining the motor magnet type, ferrite or neo and the step 318 of selecting one of the first rotor and the second rotor in accordance with desired motor magnet type. The method also includes the step 320 of assembling a motor with one of first rotor and the second rotor and first stator such that the desired motor magnet type is substantially provided.

The methods, systems, and apparatus described herein provide improved rigidity and durability of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing designs with improved strength and rigidity that reduces or eliminates excessive noise and vibration. Furthermore, the exemplary methods system and apparatus reduced noise while reducing or eliminating an increase in manufacturing cost of the motor. The methods, system and apparatus described herein may be used in any suitable application. However, they are particularly suited for HVAC and pump applications.

Exemplary embodiments of the rotor and motor are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An axial flux electric motor, comprising:
    a housing;
    a stator having a solitary ferrous core and fixedly secured to said housing and defining an inner periphery and an outer periphery therefore;
    a solitary rotor rotatably secured to said housing, the rotor including a ferrite magnet, the magnet defining at least one an outer periphery extending beyond said stator in a direction normal to the rotation of said rotor and an inner periphery extending beyond said stator in a direction normal to the rotation of said rotor, at least one of said stator or said rotor adapted for use in a fluid moving application;
    wherein the outer periphery of said magnet extends beyond said stator in a direction normal to the rotation of said rotor a first extension distance;
    wherein the inner periphery of said magnet extends beyond said stator in a direction normal to the rotation of said rotor a second extension distance;
    wherein the ferrous core is generally ring shaped defining a ferrous core radial distance; and
    wherein the first extension distance and the second extension distance may be as large as the ferrous core radial distance.

2. The motor as in claim 1, wherein the ferrite magnet has a plurality of magnet segments.

3. The motor as in claim 1, wherein a skewed magnetic field is induced into the magnet.

4. An axial flux electric motor, comprising:
    a housing;
    a stator having a solitary ferrous core and fixedly secured to said housing and defining an inner periphery and an outer periphery therefore;
    a solitary rotor rotatably secured to said housing, the rotor including a ferrite magnet, the magnet defining at least one an outer periphery extending beyond said stator in a direction normal to the rotation of said rotor and an inner periphery extending beyond said stator in a direction normal to the rotation of said rotor, at least one of said stator or said rotor adapted for use in a fluid moving application;
    wherein the outer periphery of said magnet extends beyond said stator in a direction normal to the rotation of said rotor, the outer periphery of said magnet defining a magnet diameter;
    wherein the ferrous core of said stator defines a stator core diameter; and
    wherein the magnet diameter may be as much as 50 percent larger than stator core diameter.

5. The motor as in claim 4, wherein the ferrite magnet is generally ring shaped.

6. The motor as in claim 4, wherein the ferrite magnet has a plurality of magnet segments.

7. The motor as in claim 4, wherein a skewed magnetic field is induced into the magnet.

8. The motor as in claim 4, wherein the inner periphery of said ferrite magnet extends inwardly beyond said stator in a direction normal to the rotation of said ring magnet.

9. An axial flux electric motor, comprising:
    a housing;
    a stator having a solitary ferrous core and fixedly secured to said housing and defining an inner periphery and an outer periphery therefore;
    a solitary rotor rotatably secured to said housing, the rotor including a ferrite magnet, the magnet defining at least one an outer periphery extending beyond said stator in a direction normal to the rotation of said rotor and an inner periphery extending beyond said stator in a direction normal to the rotation of said rotor, at least one of said stator or said rotor adapted for use in a fluid moving application;
    wherein the rotor further includes a rotor core, the rotor core being generally ring shaped, said rotor core defining a rotor core inner periphery, a rotor core outer periphery and a rotor core radial distance between the rotor core inner periphery and the rotor core outer periphery;
    wherein the outer periphery of said magnet extends beyond said rotor core in a direction normal to the rotation of said rotor a first extension distance;
    wherein the inner periphery of said magnet extends beyond said rotor core in a direction normal to the rotation of said rotor a second extension distance; and
    wherein the first extension distance and the second extension distance may be as large as the rotor core radial distance.

10. The motor as in claim 9, wherein the ferrite magnet has a plurality of magnet segments.

11. The motor as in claim 9, wherein a skewed magnetic field is induced into the magnet.

12. An axial flux electric motor, comprising:
    a housing;
    a stator having a solitary ferrous core and fixedly secured to said housing and defining an inner periphery and an outer periphery therefore;
    a solitary rotor rotatably secured to said housing, the rotor including a ferrite magnet, the magnet defining at least one an outer periphery extending beyond said stator in a direction normal to the rotation of said rotor and an inner periphery extending beyond said stator in a direction normal to the rotation of said rotor, at least one of said stator or said rotor adapted for use in a fluid moving application;
    wherein the rotor further includes a rotor core, the rotor core being generally ring shaped, said rotor core defining a rotor core inner periphery, a rotor core outer periphery and a rotor core radial distance between the rotor core inner periphery and the rotor core outer periphery;
    wherein the outer periphery of said magnet extends beyond said rotor core in a direction normal to the rotation of said rotor, the outer periphery of said magnet defining a magnet diameter;
    wherein the rotor core of said rotor defines a rotor core diameter; and
    wherein the magnet diameter may be as much as 50 percent larger than rotor core diameter.

13. The motor as in claim 12, wherein the ferrite magnet has a plurality of magnet segments.

14. The motor as in claim 12, wherein a skewed magnetic field is induced into the magnet.

15. The motor as in claim 12, wherein the inner periphery of said ferrite magnet extends inwardly beyond said stator in a direction normal to the rotation of said ring.

* * * * *